(12) United States Patent
Cho

(10) Patent No.: US 10,817,199 B2
(45) Date of Patent: Oct. 27, 2020

(54) MEMORY SYSTEM AND SOC INCLUDING LINEAR ADDRESS REMAPPING LOGIC

(71) Applicant: Samsung Electronics Co., Ltd., Suwon-si (KR)

(72) Inventor: Dongsik Cho, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 394 days.

(21) Appl. No.: 15/424,019

(22) Filed: Feb. 3, 2017

(65) Prior Publication Data

US 2017/0185342 A1    Jun. 29, 2017

Related U.S. Application Data

(63) Continuation of application No. 14/990,975, filed on Jan. 8, 2016, now abandoned, which is a continuation (Continued)

(30) Foreign Application Priority Data

Jun. 19, 2012  (KR) .......................... 10-2012-0065624

(51) Int. Cl.
*G06F 3/06* (2006.01)
*G06F 15/78* (2006.01)
(Continued)

(52) U.S. Cl.
CPC .......... *G06F 3/0634* (2013.01); *G06F 3/0604* (2013.01); *G06F 3/0611* (2013.01);
(Continued)

(58) Field of Classification Search
CPC ................................. G06F 12/02; G06F 12/06
See application file for complete search history.

(56) References Cited

U.S. PATENT DOCUMENTS

| 4,924,375 A | 5/1990 | Fung et al. |
| 5,051,889 A | 9/1991 | Fung et al. |

(Continued)

FOREIGN PATENT DOCUMENTS

| CN | 1043402 | 6/1990 |
| EP | 0372779 | 6/1990 |

(Continued)

OTHER PUBLICATIONS

"Memory System and SOC Including Linear Address Remaping Logic" Specification, Claims, and Prosecution history of U.S. Appl. No. 13/803,269, filed Mar. 14, 2013, by Dongsik Cho, which is stored in the United States Patent and Trademark Office (USPTO).

(Continued)

*Primary Examiner* — Charles Rones
*Assistant Examiner* — Tian-Pong Chang
(74) *Attorney, Agent, or Firm* — Onello & Mello, LLP

(57) ABSTRACT

A system-on-chip is connected to a first memory device and a second memory device. The system-on-chip comprises a memory controller configured to control an interleaving access operation on the first and second memory devices. A modem processor is configured to provide an address for accessing the first or second memory devices. A linear address remapping logic is configured to remap an address received from the modem processor and to provide the remapped address to the memory controller. The memory controller performs a linear access operation on the first or second memory device in response to receiving the remapped address.

29 Claims, 13 Drawing Sheets

Related U.S. Application Data of application No. 13/803,269, filed on Mar. 14, 2013, now Pat. No. 9,256,531.

(51) Int. Cl.

| | | |
|---|---|---|
| *G06F 12/06* | (2006.01) | |
| *G06F 12/02* | (2006.01) | |
| *G06F 13/42* | (2006.01) | |

(52) U.S. Cl.
CPC .......... *G06F 3/0625* (2013.01); *G06F 3/0638* (2013.01); *G06F 3/0673* (2013.01); *G06F 3/0683* (2013.01); *G06F 12/02* (2013.01); *G06F 12/0607* (2013.01); *G06F 15/781* (2013.01); *G06F 12/0646* (2013.01); *G06F 13/4282* (2013.01); *G06F 2212/1016* (2013.01); *G06F 2212/1024* (2013.01); *G06F 2212/1028* (2013.01); *Y02D 10/13* (2018.01); *Y02D 10/14* (2018.01); *Y02D 10/151* (2018.01)

(56) References Cited

U.S. PATENT DOCUMENTS

| | | | |
|---|---|---|---|
| 5,164,916 A | | 11/1992 | Wu et al. |
| 5,226,134 A | | 7/1993 | Alderequia et al. |
| 5,579,277 A | * | 11/1996 | Kelly .................. G11C 8/12 365/189.02 |
| 5,619,471 A | * | 4/1997 | Nunziata ............ G06F 12/0607 365/230.03 |
| 5,668,974 A | | 9/1997 | Grassi et al. |
| 5,669,874 A | | 9/1997 | Feiring |
| 5,761,695 A | * | 6/1998 | Maeda ................ G06F 12/0607 711/5 |
| 5,924,117 A | | 7/1999 | Luick |
| 5,959,640 A | | 9/1999 | Rudin et al. |
| 5,987,570 A | | 11/1999 | Hayes et al. |
| 6,161,162 A | | 12/2000 | DeRoo et al. |
| 6,483,844 B1 | | 11/2002 | Erimli |
| 6,553,478 B1 | | 4/2003 | Grossier |
| 6,691,261 B1 | | 2/2004 | Ovalekar |
| 6,791,898 B1 | * | 9/2004 | Manapat ............. G11C 7/1021 365/230.01 |
| 6,941,438 B2 | | 9/2005 | Wolrich et al. |
| 6,944,728 B2 | | 9/2005 | Calderon et al. |
| 7,173,852 B2 | | 2/2007 | Gorobets et al. |
| 7,373,453 B2 | | 5/2008 | Kang |
| 7,418,571 B2 | | 8/2008 | Wolrich et al. |
| 8,164,974 B2 | | 4/2012 | Hsu et al. |
| 8,675,417 B2 | | 3/2014 | Litsyn et al. |
| 9,256,531 B2 | * | 2/2016 | Cho .................... G06F 12/0607 |
| 9,612,648 B2 | | 4/2017 | Chun et al. |
| 2003/0167383 A1 | | 9/2003 | Gupta et al. |
| 2004/0168011 A1 | | 8/2004 | Hemming |
| 2006/0039196 A1 | | 2/2006 | Gorobets et al. |
| 2008/0055325 A1 | | 3/2008 | Seigneret et al. |
| 2009/0300299 A1 | * | 12/2009 | Saxe .................... G06F 12/0607 711/157 |
| 2010/0082885 A1 | | 4/2010 | Litsyn et al. |
| 2010/0274953 A1 | * | 10/2010 | Lee ....................... G06F 1/266 711/103 |
| 2010/0325374 A1 | * | 12/2010 | Cypher ............... G06F 12/0607 711/157 |
| 2011/0072190 A1 | * | 3/2011 | Borracini ............ G06F 12/0246 711/103 |
| 2012/0054455 A1 | | 3/2012 | Wang et al. |
| 2013/0339640 A1 | | 12/2013 | Cho |
| 2015/0046732 A1 | | 2/2015 | Chun et al. |

FOREIGN PATENT DOCUMENTS

| | | |
|---|---|---|
| JP | 04230547 | 8/1992 |
| JP | 06103164 | 4/1994 |
| JP | 10214227 | 8/1998 |
| JP | 2000029782 | 1/2000 |
| JP | 2008152687 | 7/2008 |
| JP | 2011204229 | 10/2011 |
| KR | 2019980025738 | 8/1998 |
| KR | 1997704399 | 7/2001 |
| KR | 1019970704399 | 7/2001 |
| KR | 1020050081498 | 8/2005 |
| KR | 1020050099967 | 10/2005 |
| KR | 1020100097074 | 9/2010 |
| TW | 201019325 | 5/2010 |
| TW | 425511 | 2/2014 |
| WO | WO9620480 | 7/1996 |

OTHER PUBLICATIONS

"Memory System and SOC Including Linear Address Remaping Logic" Specification, Claims, and Prosecution history of U.S. Appl. No. 14/990,975, filed Jan. 8, 2016, by Dongsik Cho, which is stored in the United States Patent and Trademark Office (USPTO).

* cited by examiner

Fig. 3

Memory Access Address

| | Interleaving Bit | | |
|---|---|---|---|
| MSB | ILB | Chunk | LSB |
| Don't care | 0 | 0 | 0 |
| | 0 | 0 | 1 |
| | 0 | 1 | 0 |
| | 0 | 1 | 1 |
| | 1 | 0 | 0 |
| | 1 | 0 | 1 |
| | 1 | 1 | 0 |
| | 1 | 1 | 1 |

MEMORY SYSTEM AND SOC INCLUDING LINEAR ADDRESS REMAPPING LOGIC

CROSS-REFERENCE TO RELATED APPLICATIONS

This application is a continuation application of U.S. patent application Ser. No. 14/990,975, filed on Jan. 8, 2016, which is a continuation application of U.S. patent application Ser. No. 13/803,269, field on Mar. 14, 2013, which claims the benefit of Korean Patent Application No. 10-2012-0065624 filed Jun. 19, 2012, in the Korean Intellectual Property Office, the entire contents of which are hereby incorporated by reference.

BACKGROUND

The inventive concepts described herein relate to a memory system, and more particularly, relate to memory system and a system on a chip (SoC) including linear address remapping logic.

A memory system may commonly include two or more processors. For example, a mobile system may include a modem and an application processor, or multimedia processor. The memory system including two or more processors may necessitate at least two or more memory devices in order to service the multiple processors independently.

In the above example, the modem may be accompanied by a NOR flash memory to be used as code storage and a DRAM to be used for execution of code. The application processor may be accompanied by a NAND flash memory for the storage of code and data as well as a DRAM for the execution of code. Code and data may be transferred between the modem and the application processor through an UART (Universal Asynchronous Receiver Transmitter), SPI (Serial Peripheral Interface), or SRAM interface.

Meanwhile, for supporting the operation of the mobile system, the memory system may perform a data interleaving operation through two or more DRAMs. In such an interleaving operation, the memory system may alternately access two or more DRAMs. This has the effect of improving system performance.

SUMMARY

Current memory systems that employ interleaving as a way to improve performance can also consume relatively more power. In some situations, it may be possible to access only a single DRAM for performing an operation, rather than multiple DRAMs, with minimal or no adverse effect on system performance. In such situations, it may be more advantageous to use a linear access method, rather than an interleaving method. Methods and systems of the present inventive concepts provide for efficient use of power in memory systems that employ multiple memory devices.

In accordance with embodiments of the inventive concepts, a system-on-chip connected to a first memory device and a second memory device, comprises: a memory controller configured to control an interleaving access operation on the first and second memory devices; a modem processor configured to provide an address for accessing the first or second memory devices; and a linear address remapping logic configured to remap an address received from the modem processor and to provide the remapped address to the memory controller, wherein the memory controller performs a linear access operation on the first or second memory device in response to receiving the remapped address.

In some embodiments, the linear address remapping logic receives an address from the modem processor, remaps an address of the modem processor selectively in response to a control signal, and provides the remapped address to the memory controller.

In some embodiments, the remapped address is partitioned into an interleaving access area and a linear access area, wherein the remapping of the address operation performed by the linear address remapping logic is accomplished by changing a location of a most significant bit of the linear access area.

In some embodiments, the linear address remapping logic determines whether an address input from the modem processor belongs to the linear access area, based on a base address and a size of the linear access area.

In some embodiments, the linear address remapping logic decides the address input from the modem processor to belong to the linear access area when the address input from the modem processor is equal to or greater than the base address of the linear access area and less than a sum of the base address and the size of the linear access area.

In some embodiments, the linear address remapping logic decides the address input from the modem processor to belong to the interleaving access area when the address input from the modem processor is less than the base address of the linear access area or equal to or greater than a sum of the base address and the size of the linear access area.

In accordance with embodiments of the inventive concepts, a method of accessing first and second memory devices connected to a system-on-chip, comprises: receiving an address for accessing the first or second memory from a modem processor of the system-on-chip; determining whether the address corresponds to an interleaving access area or to a linear access area; and performing a linear access operation or an interleaving access operation on the first and second memory devices according to the determination result.

In some embodiments, the system-on-chip further comprises linear address remapping logic which is configured to remap an address received from the modem processor and to provide the remapped address to a memory controller.

In some embodiments, the remapped address is partitioned into an interleaving access area and a linear access area and wherein the remapping of the address operation performed by the linear address remapping logic is performed by changing a location of a most significant bit of the linear access area.

In some embodiments, the linear address remapping logic determines whether an address input from the modem processor belongs to the linear access area, based on a base address and a size of the linear access area.

In accordance with embodiments of the inventive concepts, a memory system comprises: a memory controller configured to control an interleaving access operation on the first and second memory devices; a modem processor configured to provide an address for accessing the first or second memory device; and linear address remapping logic configured to remap an address received from the modem processor to provide the remapped address to the memory controller, wherein the memory controller performs a linear access operation on the first or second memory device in response to receiving the remapped address.

In some embodiments, the remapped address is partitioned into an interleaving access area and a linear access area.

In some embodiments, an address remapping operation of the linear address remapping logic is performed by changing a location of a most significant bit of the linear access area.

In some embodiments, the linear address remapping logic determines whether an address input from the modem processor belongs to the linear access area, based on a base address and a size of the linear access area.

In some embodiments, the linear address remapping logic decides the address input from the modem processor to belong to the linear access area when the address input from the modem processor is equal to or greater than the base address of the linear access area and less than a sum of the base address and the size of the linear access area.

In some embodiments, the linear address remapping logic decides the address input from the modem processor to belong to the interleaving access area when the address input from the modem processor is less than the base address of the linear access area or equal to or greater than a sum of the base address and the size of the linear access area.

In some embodiments, the linear access area comprises one or more linear access areas.

In some embodiments, the memory system further comprises a central processing unit, and wherein the central processing unit, the memory controller, the modem processor, and the linear address remapping logic are implemented on a system-on-chip.

In some embodiments, the memory system further comprises a central processing unit, and wherein the central processing unit, the memory controller, and the linear address remapping logic are implemented on a system-on-chip and wherein the modem processor is implemented on a modem device.

In accordance with embodiments of the inventive concepts, a memory system comprises: a memory controller configured to control an interleaving access operation on the first and second memory devices; a modem processor configured to provide an address for accessing the first or second memory device; and linear address remapping logic configured to receive an address from the modem processor, to remap the address received from the modem processor selectively according to a control signal received from a central processing unit, and to provide the remapped address to the memory controller, wherein the memory controller performs a linear access operation on the first or second memory device in response to the remapped address.

In some embodiments, the remapped address is partitioned into an interleaving access area and a linear access area and wherein an address remapping operation of the linear address remapping logic is performed by changing a location of a most significant bit of the linear access area.

In some embodiments, the linear address remapping logic determines whether an address input from the modem processor belongs to the linear access area, based on a base address and a size of the linear access area.

In some embodiments, the linear address remapping logic decides the address input from the modem processor to belong to the linear access area when the address input from the modem processor is equal to or greater than the base address of the linear access area and less than a sum of the base address and the size of the linear access area.

In some embodiments, the linear address remapping logic decides the address input from the modem processor to belong to the interleaving access area when the address input from the modem processor is less than the base address of the linear access area or equal to or greater than a sum of the base address and the size of the linear access area.

In accordance with embodiments of the inventive concepts, a memory system comprises: a memory controller in communication with multiple memory devices, the memory controller configured to control the multiple memory devices according to an interleaving access operation; a first processor generating address signals for accessing memory locations of the multiple memory devices; a linear address remapping unit that receives the address signals, and, in response, generates remapped address signals; the memory controller receiving the remapped address signals, and, in response, controlling the multiple memory devices according to a linear access operation.

In some embodiments, the memory controller, the first processor, and the linear address remapping unit comprise a system-on-a-chip (SOC), wherein the multiple memory devices are external to the SOC.

In some embodiments, the linear address remapping unit decides whether to generate remapped address signals or to pass original address signals, in response to a control signal.

In some embodiments, the control signal is generated by a second processor, wherein the first processor comprises a modem processor and wherein the second processor comprises a central processing unit (CPU).

In some embodiments, the linear address remapping unit modifies a first portion of the original address signals that is in a linear access area of the address signals, moves a most significant bit of the linear access area to a less significant bit, and shifts bits more significant than the less significant bit in a direction toward the most significant bit to generate the remapped address signals.

In some embodiments, a second portion of the original address signals that is in an interleaved address area of the address signals remains unchanged in the remapped address signals.

According to an embodiments of the inventive concepts, when the interleaving mode is selected by CONFIG signal, at least two memory ports can write or read simultaneously larger data to and from the corresponding memory ports to increase data band width by ignoring some ILB bit in the original address. On the other hand, in linear addressing mode, only a selected port can operate and reduce power consumption compared with the interleaving mode.

BRIEF DESCRIPTION OF THE FIGURES

The above and other objects and features will become apparent from the following description with reference to the following figures, wherein like reference numerals refer to like parts throughout the various figures unless otherwise specified, and wherein

FIG. 3 is a table for describing an interleaving access method according to an address of a memory system of the type illustrated in FIG. 1.

DETAILED DESCRIPTION

Figure 1:
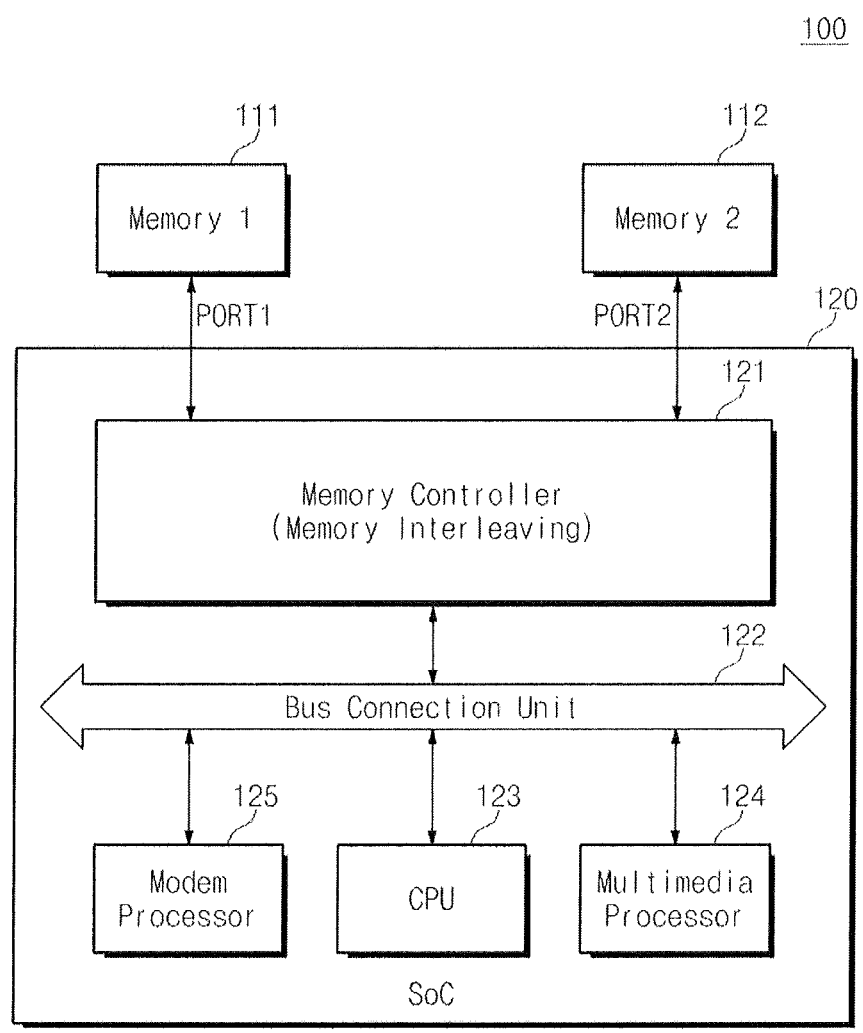
FIG. 1 is a block diagram schematically illustrating a memory system according to an embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

A memory system according to an embodiment of the inventive concepts may perform an interleaving access operation in which an application processor uses two or more memory devices (e.g., DRAMs) and accesses ports of the memory devices in turn. The inventive concepts may perform the interleaving access operation on two or more memory devices (e.g., DRAMs), but may perform a linear access operation partially with respect to a specific area of a memory. Below, an interleaving access operation and a partial linear access operation of the memory system according to an embodiment of the inventive concepts will be described.

FIG. 1 is a block diagram schematically illustrating a memory system according to an embodiment of the inventive concepts. Referring to FIG. 1, a memory system 100 may include a first memory device 111, a second memory device 112, and an application processor 120 implemented on a system-on-chip (SoC).

The application processor 120 may include a memory controller 121 to control the first and second memory devices 111 and 112, a bus connection unit 122, a CPU 123, a multimedia processor 124, and a modem processor 125. The memory controller 121 may access the first memory device 111 through a first port and the second memory device 112 through a second port. The CPU 123 may control an overall operation of the application processor 120. Also, the CPU 123 may control peripheral devices such as the memory devices 111 and 112. In the present specification, the terms "memory" and "memory device" are interchangeable.

The multimedia processor 124 may be configured to control multimedia devices such as a camera, a display, and so on. To control the multimedia devices, the multimedia processor 124 may access the first and second memory devices 111 and 112 connected with the application processor 120 according to an interleaving access arrangement. For example, the multimedia processor 124 may alternately access the first and second memory devices 111 and 112 through the memory controller 121.

The modem processor 125 implemented on the system-on-chip may comprise a processor configured to perform wireless communication with a base station or with other communication devices. The modem processor 125 may access the first memory device 111 or the second memory device 112 servicing the application processor 120. At this time, like the multimedia processor 124, the modem processor 125 may access both the first and second memory devices 111 and 112 in an interleaving arrangement. For example, the modem processor 125 may alternately access the first and second memory devices 111 and 112 through the memory controller 121.

Figure 2:
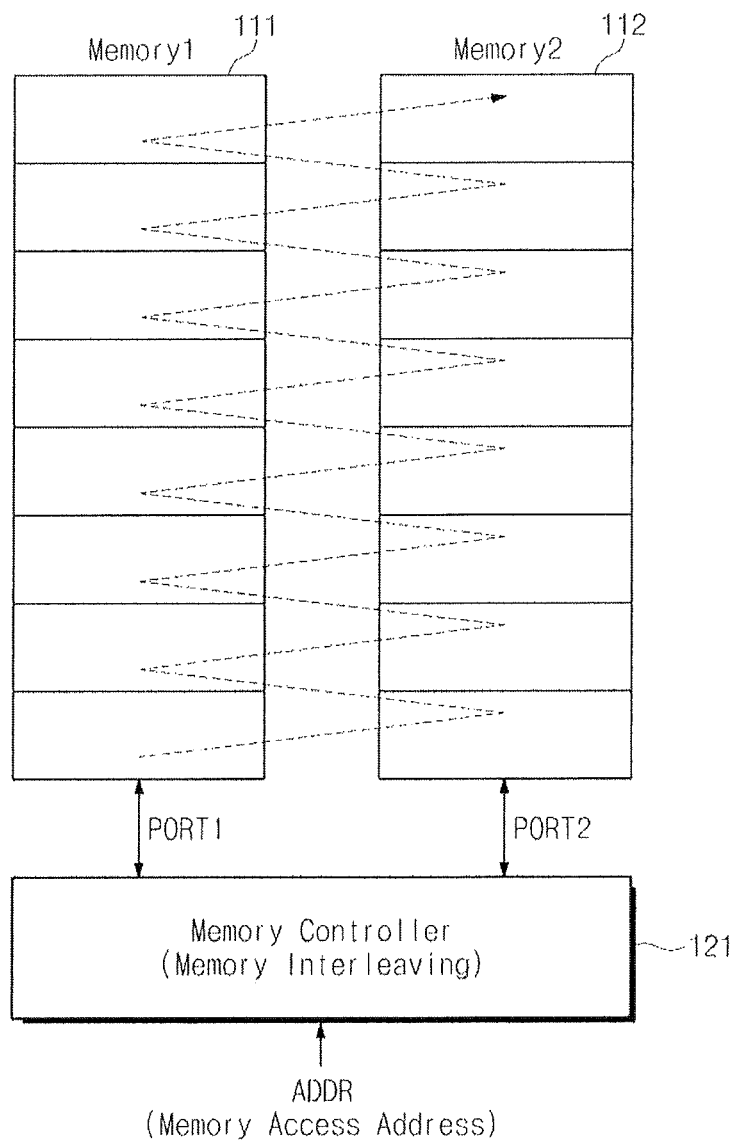
FIG. 2 is a block diagram schematically illustrating an interleaving access operation of a memory system of the type illustrated in FIG. 1.

FIG. 2 is a block diagram schematically illustrating an interleaving access operation of a memory system of the type illustrated in FIG. 1. Referring to FIG. 2, a memory controller 121 may receive a memory access address ADDR, and, in response, perform an interleaving access operation on the first and second memory devices 111 and 112 through first and second ports PORT1, PORT2.

The memory controller 121 may write data to the first memory device 111 through the first port or read data from the first memory device 111 through the first port. The first memory device 111 may be supplied with a power and a clock for a memory access. The memory controller 121 may access the second memory device 112 through the second port. The second memory device 112 may be supplied with a power and a clock. As described above, the memory controller 121 may perform an interleaving access operation on the first and second memory devices 111 and 112 in response to the memory access address ADDR.

FIG. 3 is a table for describing an interleaving access method according to an address of a memory system of the type illustrated in FIG. 1. Referring to FIG. 3, a memory access address ADDR may include chunk bits and an interleaving bit ILB.

In an example of FIG. 3, the chunk bits are located at the least-significant-bit LSB side, and the interleaving bit ILB may be located adjacent the chunk bits. A memory controller 121 (refer to FIG. 2) may perform an interleaving access operation in response to the chunk unit, and may decide on whether to access memory through the first port PORT1 or a second port PORT2 (see FIG. 2) in response to the interleaving bit ILB. As illustrated in FIG. 3, in an example embodiment, the first port may be selected when the interleaving bit ILB is '0', and the second port may be selected when the interleaving bit ILB is '1'.

Herein, the unit of the interleaving operation may be decided according to the number of chunk bits. For example, it may be assumed that 1-byte data is stored according to an address. Under this assumption, when the number of chunk bits is 2, an interleaving access operation may be performed using a 4-byte unit. When the number of chunk bits is m, the interleaving access operation may be performed using a $2^m$-byte unit.

Meanwhile the number of interleaving bits may be decided according to the number of memory devices being accessed. For example, a single interleaving bit may be used when the number of memory devices is 2. Two interleaving bits may be used when the number of memory devices is 4. That is, n interleaving bits may be used when the number of memory devices is $2^n$.

In the example memory system illustrated in FIGS. 1 to 3, a modem processor 125 may perform an interleaving access operation with respect to first and second memory devices 111 and 112. That is, the modem processor 125, as illustrated in FIG. 2, may perform the interleaving access operation using all available memory devices, in this case, the first and second ports are used in turn.

In some example embodiments, a memory system according to an embodiment of the inventive concepts may support a partial interleaving access operation. That is, in performing the interleaving access operation on the first and second memory devices 111 and 112, the memory system may optionally perform a linear access operation on the first memory device 111 or the second memory device 112. On the other hand, in performing a linear access operation, the memory system may optionally perform an interleaving access operation.

The memory system according to an embodiment of the inventive concepts may perform the partial interleaving access operation in various manners. Below, an example embodiment of a method in which the partial interleaving access operation is performed without a change in the memory controller will be described.

Figure 4:
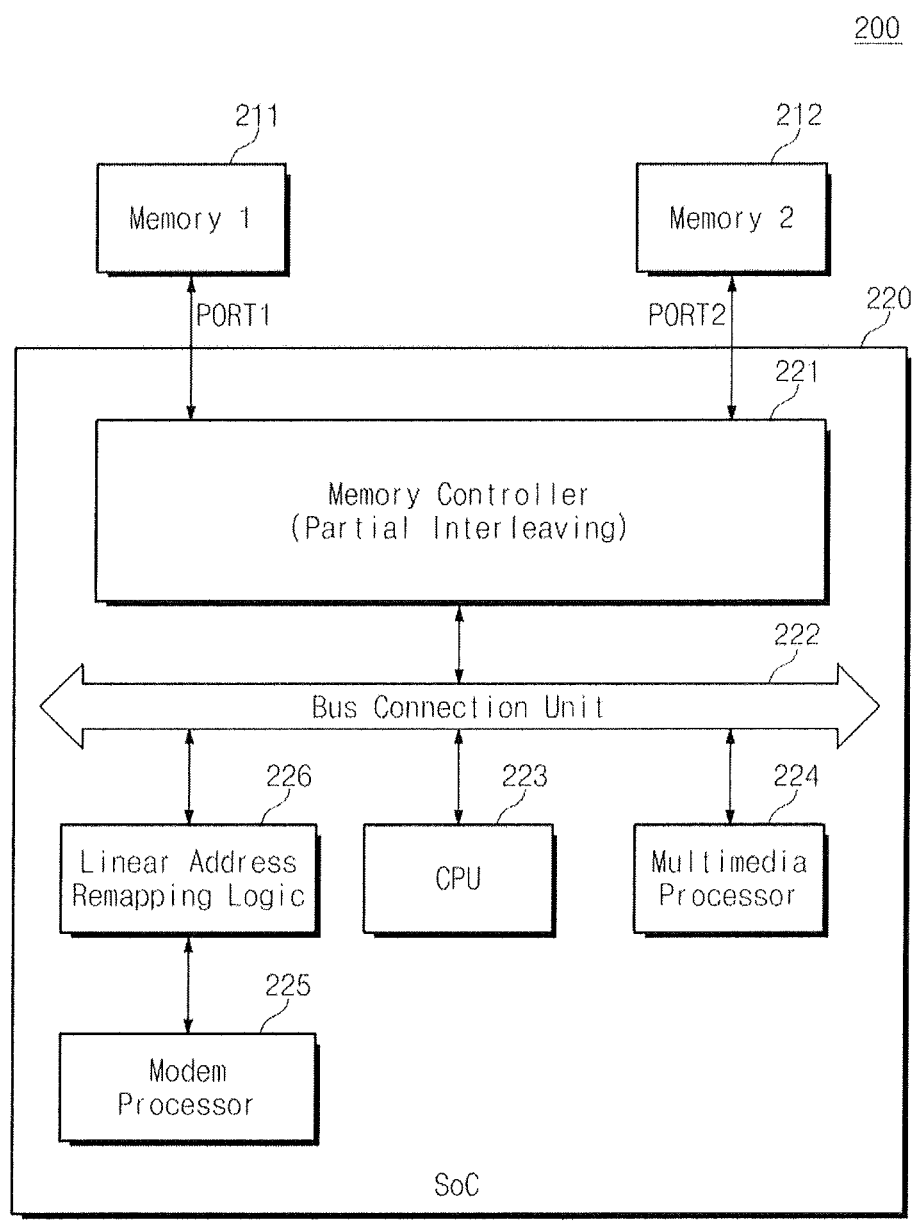
FIG. 4 is a block diagram schematically illustrating a memory system that is configured to perform a partial interleaving access operation according to an embodiment of the inventive concepts.

FIG. 4 is a block diagram schematically illustrating a memory system that is configured to perform a partial interleaving access operation according to an embodiment of the inventive concepts. Referring to FIG. 4, a memory system 200 may include a first memory 211, a second memory 212, and an application processor 220 implemented on a system-on-chip (SoC).

The application processor 220 may comprise a memory controller 221, a bus connection unit 222, a CPU 223, a multimedia processor 224, a first processor 225, and linear address remapping logic 226. The memory controller 221 may access the first memory 211 via a first port PORT1 and the second memory 212 via a second port PORT2.

In the memory system 200 of FIG. 4, a linear access operation may be performed at a specific area, or in a specific address region, of the first and second memory devices 211 and 212 by connecting the linear address remapping logic 226 to the first processor 225. The inventive concepts may thus perform a partial interleaving access operation without requiring a change of the memory controller 221 by adding the linear address remapping logic 226. In some embodiments, the first processor 225 may be a modem processor.

Figure 5:
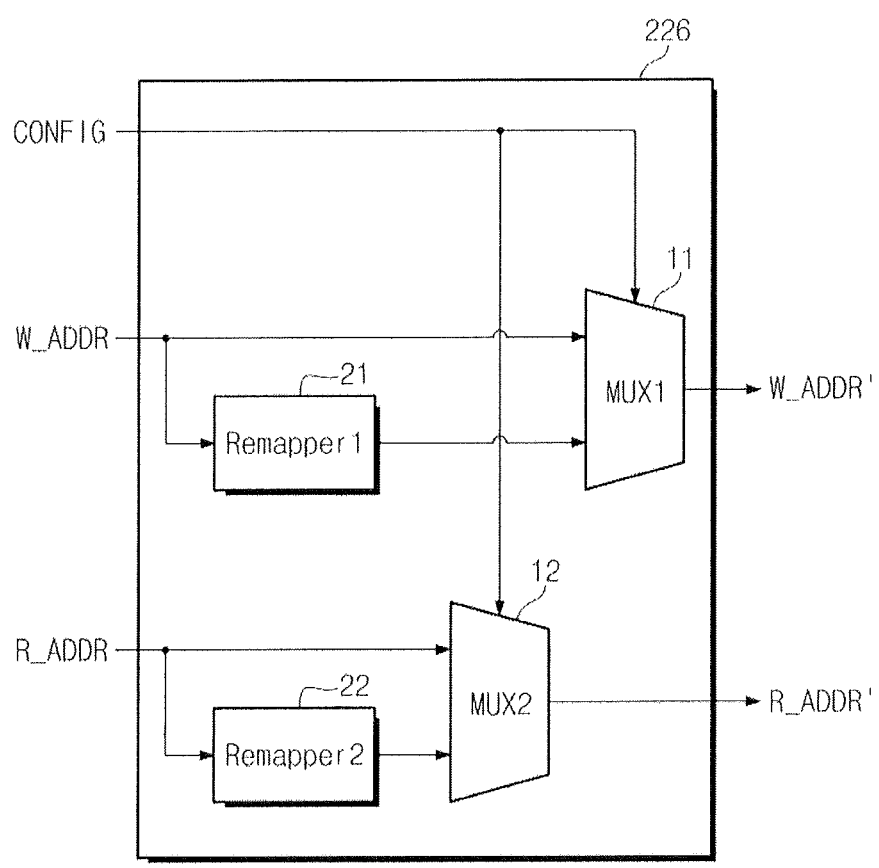
FIG. 5 is a block diagram schematically illustrating an example embodiment of the linear address remapping logic illustrated in FIG. 4, according to an embodiment of the inventive concepts.

FIG. 5 is a block diagram schematically illustrating an example embodiment of the linear address remapping logic illustrated in FIG. 4, according to an embodiment of the inventive concepts. Referring to FIG. 5, linear address remapping logic 226 may include a first selector 11, a second selector 12, a first remapper 21, and a second remapper 22. Herein, the first selector 11 and the first remapper 21 may be used when a write address W_ADDR is received, and the second selector 12 and the second remapper 22 may be used when a read address R_ADDR is received.

The linear address remapping logic 226 may receive a selection signal CONFIG from a CPU 223 (refer to FIG. 4), and, in response to the state of the selection signal CONFIG, select whether an interleaving access operation or a partial linear access operation will be enabled. For example, when the selection signal CONFIG is 0, an address W_ADDR or R_ADDR received from a first processor 225 may be provided to a memory controller 221 (refer to FIG. 4). When the selection signal CONFIG is 1, an address W_ADDR' or R_ADDR' remapped by the first remapper 21 or the second remapper 22 may be provided to the memory controller 221. Described below is an example in which the linear address remapping logic 226 selects the partial linear access operation.

Figure 6:
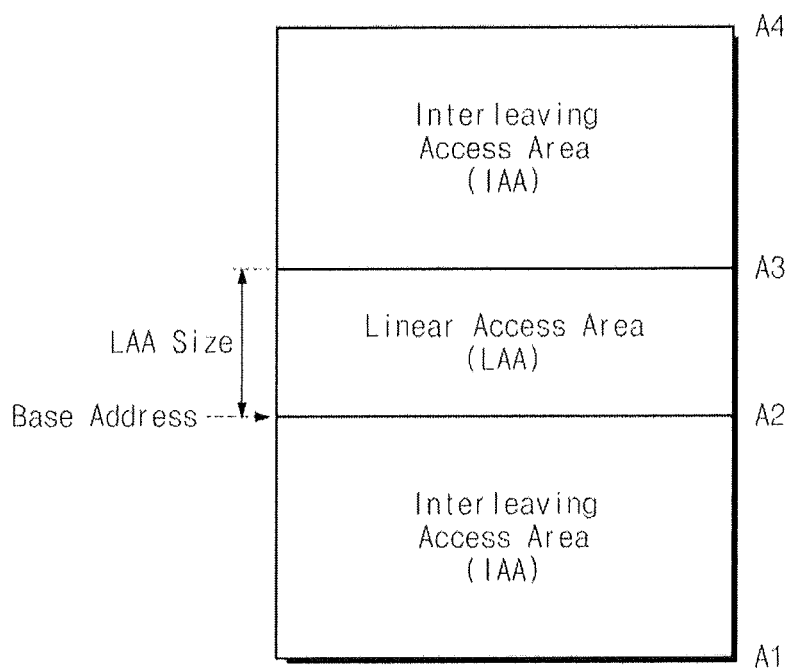
FIG. 6 is a conceptual diagram illustrating a range of operating addresses of the linear address remapping logic of FIG. 4, according to an embodiment of the inventive concepts.

FIG. 6 is a conceptual diagram illustrating a range of operating addresses of the linear address remapping logic of FIG. 4, according to an embodiment of the inventive concepts. Referring to FIG. 6, a memory access address may be partitioned or divided into an interleaving access area IAA, including memory addresses designated for an interleaving access operation to be performed and a linear access area LAA, including memory addresses designated for a linear access operation to be performed.

In FIG. 6, the interleaving access operation may be performed at interleaving access areas IAA respectively defined within addresses (A1 and A2) and within addresses (A3 and A4). Herein, an address range where linear address remapping logic 226 (refer to FIG. 4) operations may be defined within addresses A2 and A3. Herein, the address A2 may be an LAA base address, and the address A3 may be an address defined by (LAA base address+LAA size−1). The linear address remapping logic 226 may receive the LAA base address and the LAA size as configuration values for operation of the LAA.

Figure 7:
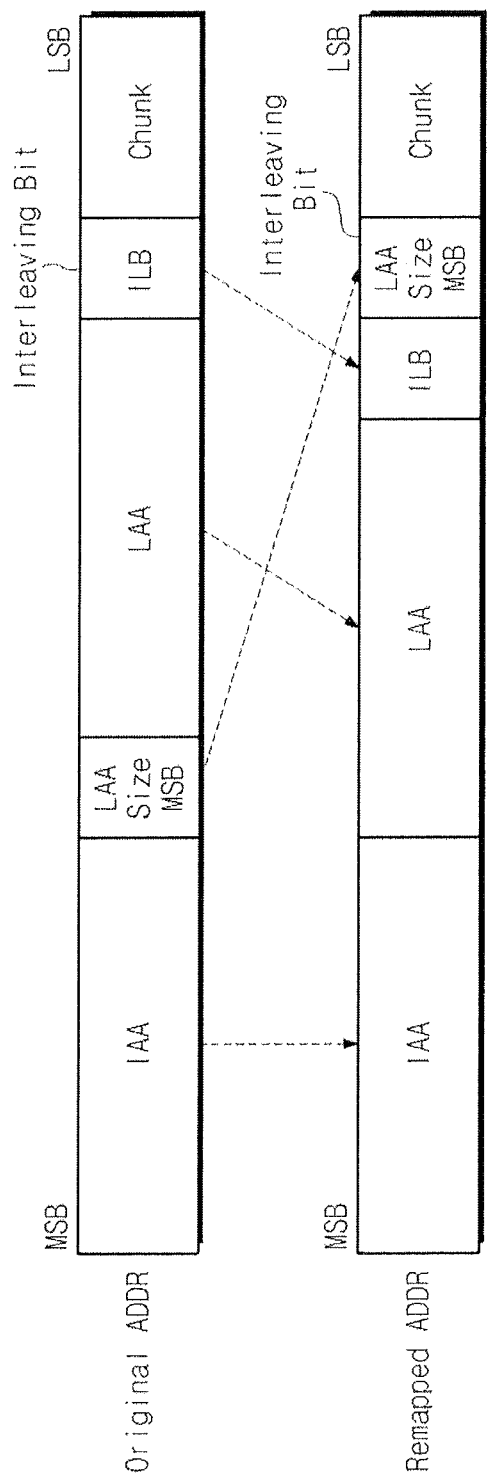
FIG. 7 is a diagram schematically illustrating an address remapping method of the linear address remapping logic in FIGS. 4 and 5, according to an embodiment of the inventive concepts.

FIG. 7 is a diagram schematically illustrating an address remapping method of the linear address remapping logic in FIGS. 4 and 5, according to an embodiment of the inventive concepts. In FIG. 7, an original address may be an address W_ADDR or R_ADDR as provided to linear address remapping logic 226 from a first processor 225 (refer to the example of FIG. 4). A remapped address may be an address W_ADDR' or R_ADDR' as remapped by the linear address remapping logic 226.

Referring to FIG. 7, a memory access address ADDR may include chunk bits and an interleaving bit ILB. Chunk bits may indicate an execution unit of an interleaving access operation, and the interleaving bit ILB or bits may be used to decide which memory port is to be accessed; in the present example, whether a first port or a second port is to be accessed. The LAA bits may indicate an address in the address range where a linear access operation is to be performed, and an IAA bits may indicate an address in the address range where an interleaving access operation is to be performed.

The linear address remapping logic 226 may perform a remapping operation using an LAA size MSB of the linear address. For example, in the case that the LAA size is 64 megabytes, a $26^{th}$ bit (log 2(26)) being a bit corresponding to log 2(LAA size) may be moved to the position of the interleaving bit of the remapped ADDR. Any remaining bits of the remapped ADDR more significant than the interleaving bit or bits are shifted in the direction of the MSB as shown. The interleaving bit ILB and the LAA bits are shifted to the left, while the IAA bits remain in their positions.

In the above description, an interleaving bit corresponding to the linear access area LAA may be made to have the same value (0 or 1), so that a linear access operation can be performed in a situation which otherwise would have led to an interleaved operation. In the present example embodiment, the linear address remapping logic 226 uses the LAA sized MSB of the original address as the interleaving bit in the remapped address. However, the inventive concepts are not limited thereto. It is possible to perform a remapping operation using other suitable approaches.

Figure 8:
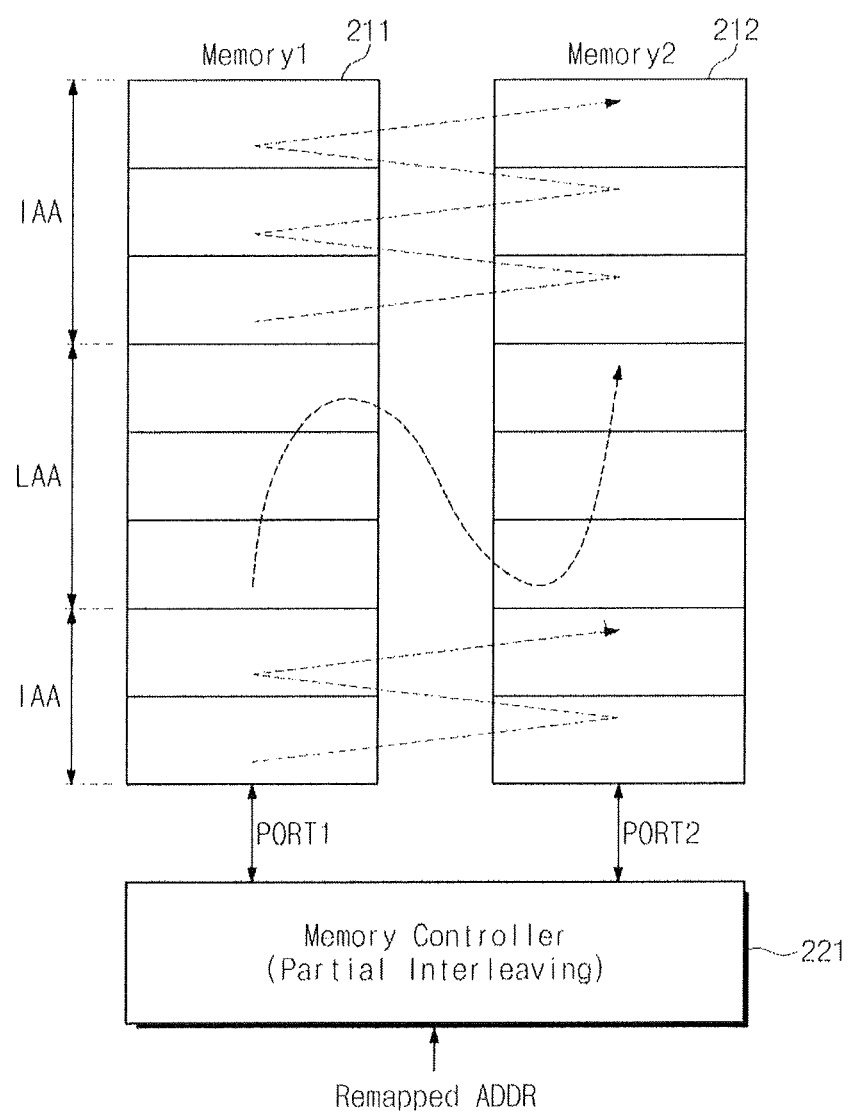
FIG. 8 is a block diagram conceptually illustrating a partial interleaving access operation of a memory system of the type illustrated in FIG. 4, according to an embodiment of the inventive concepts.

FIG. 8 is a block diagram conceptually illustrating a partial interleaving access operation of a memory system of the type illustrated in FIG. 4, according to an embodiment of the inventive concepts. Referring to FIG. 8, a memory controller 221 may receive one or more remapped addresses that cause it to perform a partial interleaving access operation on first and second memory devices 211 and 212 via first and second ports.

In the present example embodiment, at certain times in its operation, the memory controller 221 may alternately access the first and second memory devices 211 and 212 through the first and second ports during an IAA period. That is, an interleaving access operation on the first and second memory devices 211 and 212 may be performed. At other times in its operation, the memory controller 221 may perform a linear access operation on the first memory 211 via the first port during an LAA period. If the linear access operation on the first memory 211 is completed, for example, if the upper memory address of the LAA region of the first memory device 211 has been reached, the memory controller 221 may continue the linear access operation on the second memory 212 via the second port. In another operation, the memory controller 221 may alternately access the first and second memory devices 211 and 212 through the first and second ports during an IAA period. In this manner, an interleaving access operation on the first and second memory devices 211 and 212 may be performed as well as a linear access operation. Thus the memory system has a partial interleaving access operation capability in connection with the present inventive concepts.

Figure 9:
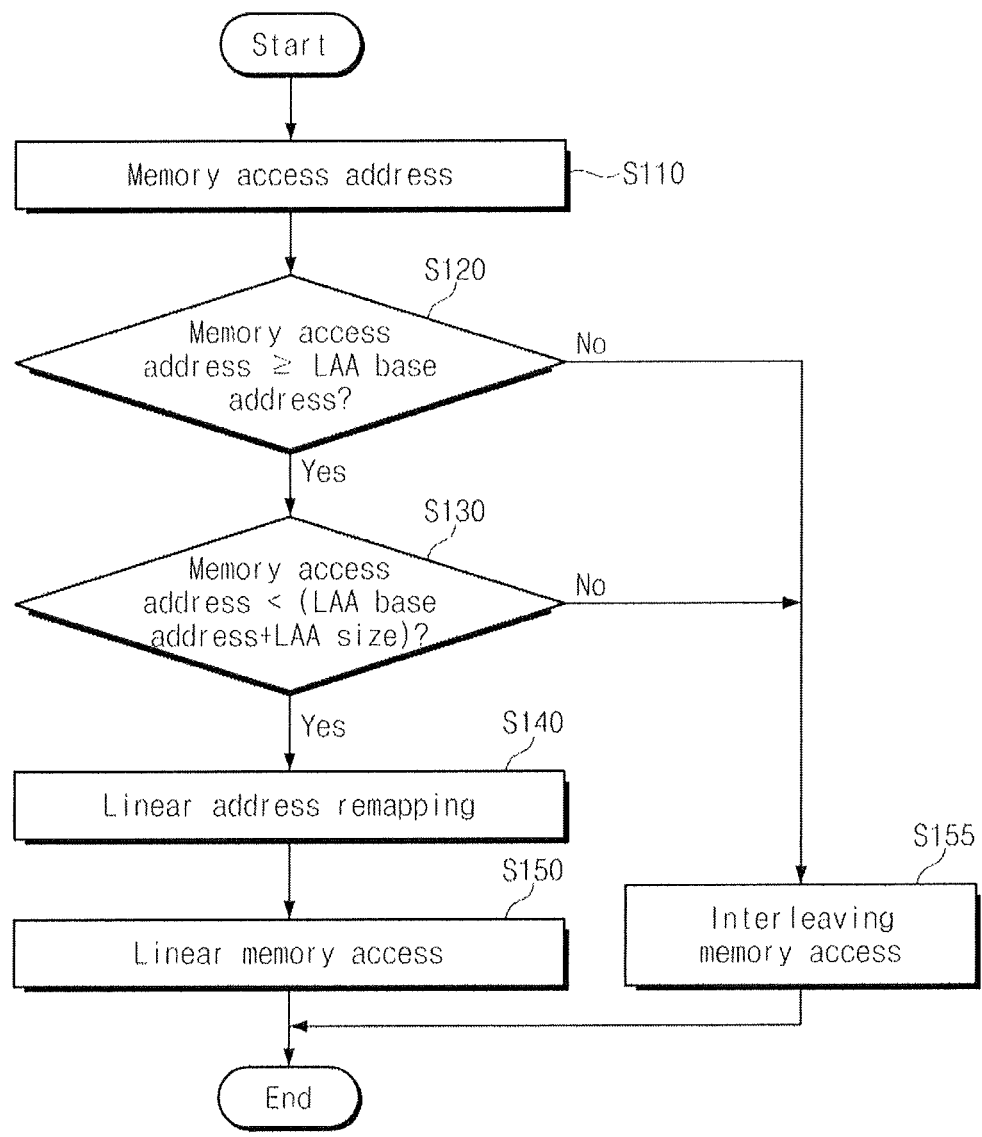
FIG. 9 is a flow chart for describing a partial interleaving access operation of a memory system of the type illustrated in FIG. 4, according to an embodiment of the inventive concepts.

FIG. 9 is a flow chart for describing a partial interleaving access operation of a memory system of the type illustrated in FIG. 4, according to an embodiment of the inventive concepts.

A partial interleaving access operation of a memory system will now be more fully described with reference to FIGS. 4 to 9.

In operation S110, a memory access address may be received. Linear address remapping logic 226 may have information pertaining to a base address and a size of a linear access area LAA. The linear address remapping logic 226 may decide whether the input memory access address belongs to an interleaving access area IAA or a linear access area LAA, based on the LAA base address and the LAA size.

In operation S120, the linear address remapping logic 226 may determine whether the memory access address is larger than the LAA base address. If the memory access address is less than the LAA base address, in operation S155, an interleaving access operation may be performed. If the memory access address is equal to or larger than the LAA base address, the method proceeds to operation S130.

In operation S130, the linear address remapping logic 226 may determine whether the memory access address is less than (LAA base address+LAA size). If not, in operation S155, the interleaving access operation may be performed. If so, the method proceeds to operation S140.

In operation S140, the linear address remapping logic 226 may perform linear address remapping. With the linear address remapping, as described with reference to FIG. 7, an LAA size MSB may be move to the position of an interleaving bit, and remaining upper bits of the LAA may be shifted in the direction of the MSB.

In operation S150, a memory controller 221 may receive a remapped address to perform a linear access operation on a first memory 211 or a second memory 212 at address LAA.

In operation S155, in a case where an interleaved access operation is to be performed, the memory controller 221 may perform the interleaving access operation on the first and second memory devices 211 and 212 at address IAA.

A memory system 200 according to an embodiment of the inventive concepts may determine whether a memory access address belongs to a linear access area LAA, through operations S120 and S130. As illustrated in FIG. 6, in a case where the memory access address belongs to an interleaving access area IAA (A1~A2, A3~A4), the interleaving access operation may be performed. In a case where the memory access address belongs to a linear access area LAA (A2~A3), the linear access operation may be performed.

Figure 10:
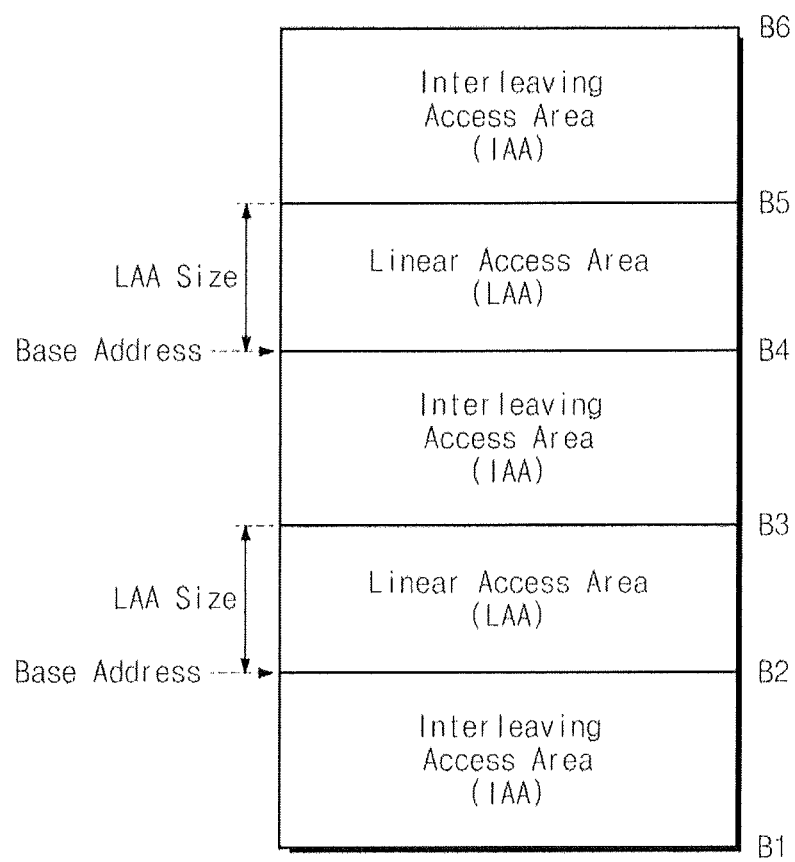
FIG. 10 is a conceptual diagram illustrating an example in which two linear access areas are present, according to an embodiment of the inventive concepts.

Meanwhile, a memory system according to an embodiment of the inventive concepts is applicable to a case where two or more linear access areas LAA exist in the thus-partitioned memory device. FIG. 10 is a conceptual diagram illustrating an example in which two linear access areas are present, according to an embodiment of the inventive concepts.

In FIG. 10, an interleaving access operation may be performed by accessing addresses within interleaving access areas IAA respectively defined by addresses intervals B1~B2, B3~B4, and B5~B6, and a linear access operation may be performed by accessing addresses at linear access areas LAA respectively defined by address intervals B2~B3 and B4~B5.

Herein, linear address remapping logic 226 (refer to FIG. 4) may operate address ranges B2~B3 and B4~B5 as illustrated in FIG. 10. Herein, each of the addresses B2 and B4 may comprise an LAA base address, and each of the addresses B3 and B5 may comprise (LAA base address+ LAA size−1). The linear address remapping logic 226 may receive the LAA base address and the LAA size as configuration values to operate the partitioning of the memory device to include and define the LAA. Returning to FIG. 4, the linear address remapping logic 226 can be connected to a CPU 223 or a multimedia processor 224 in such a manner that the linear address remapping logic 226 is connected to the first processor 225. Also, the linear address remapping logic 226 can be connected to share processors such as the CPU 223, the multimedia processor 224, and the first processor 225.

Figure 11:
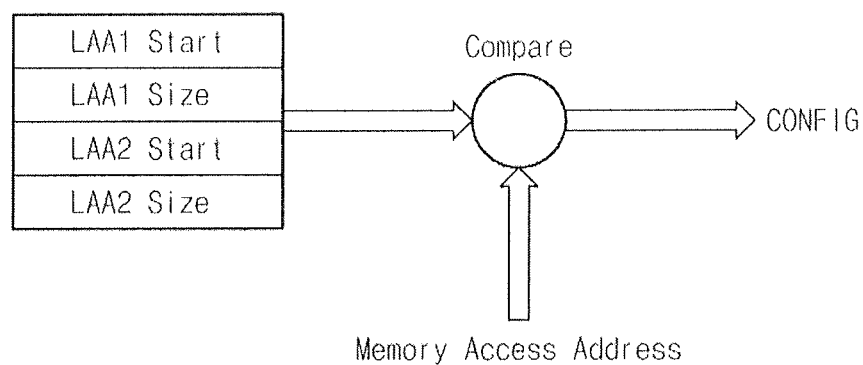
FIG. 11 is a block diagram for generation of a CONFIG signal controlling a remapping signal according to setting of a special function register (SFR).

FIG. 11 is a block diagram for generation of a CONFIG signal controlling a remapping signal according to setting of a special function register (SFR). LAA1 Stat may be a start address of a first area for a linear access, and LAA1 size may indicate a size of the LAA1 area. LAA2 Stat may be a start address of a second area for a linear access, and LAA2 size may indicate a size of the LAA2 area. A special function register (SFR) may be set by a CPU. The special function register (SFR) may be compared with a memory access address. When the memory access address belongs to the LAA1 or LAA2, a signal CONFIG may be activated such that a remapping address is selected.

Although the above example embodiment illustrates a memory system including a modem chip that is integrated with the memory system on the same system-on-chip (SoC), the memory system according to the inventive concepts is equally applicable to a case where a modem chip is external to the system-on-chip (SoC). In this case, the modem chip and the system-on-chip may be interconnected via a chip-to-chip (C2C) interface.

Figure 12:
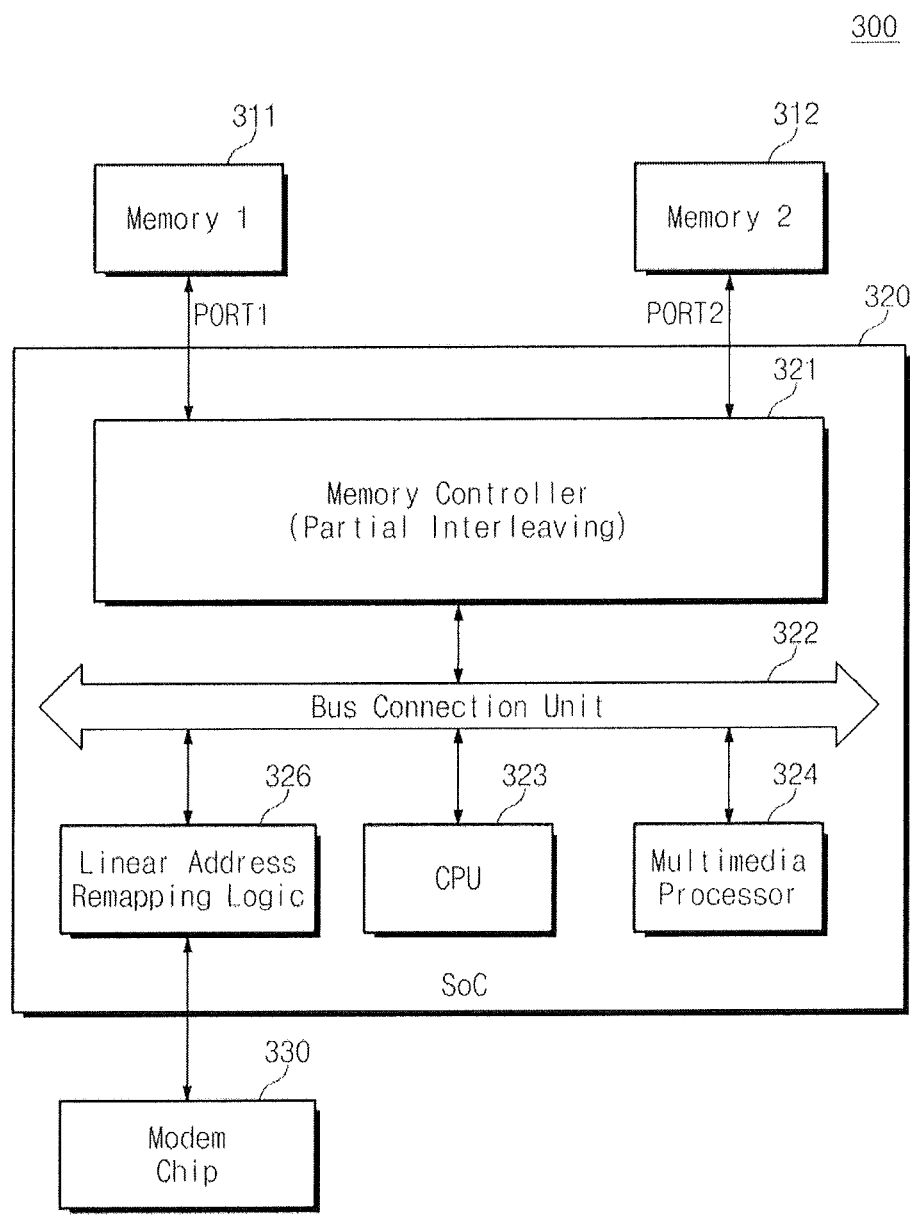
FIG. 12 is a block diagram schematically illustrating a memory system in which a modem chip is external to, and in communication with, a system-on-chip, according to an embodiment of the inventive concepts.

FIG. 12 is a block diagram schematically illustrating a memory system in which a modem chip is external to, and in communication with, a system-on-chip, according to an embodiment of the inventive concepts. Referring to FIG. 12, a memory system 300 may include a first memory 311, a second memory 312, an application processor 320 implemented on a system-on-chip (SoC), and a modem chip 330.

The application processor 320 may include a memory controller 321, a bus connection unit 322, a CUP 323, a multimedia processor 324, and linear address remapping logic 326. The memory controller 321 may access the first memory 311 via a first port and the second memory 312 via a second port.

In the memory system 300 of FIG. 12, a linear access operation may be performed at a specific area of the first and second memory devices 311 and 312 by connecting the linear address remapping logic 326 to the modem chip 330. The inventive concepts may perform a partial interleaving access operation without requiring a change of the memory controller 321 by including the linear address remapping logic 326. In FIG. 12, the linear address remapping logic 326 can be placed between the bus connection unit 322 and the memory controller 321.

As described above, a memory system according to an embodiment of the inventive concepts may perform an interleaving access operation or a partial linear access operation with respect to two or more memory devices. It is possible to use memory devices effectively by adjusting a bandwidth balance among two or more memory devices through an interleaving access operation.

Meanwhile, in the case of the memory dynamics required when using a modern, the memory demands are such that there is no need to perform interleaving access with respect to multiple memory devices. In this case, the inventive concepts may employ a linear access operation. In particular, the inventive concepts may be efficiently used in mobile systems requiring reduced power consumption. The inventive concepts may perform a partial linear access operation in a memory system using an interleaving access operation. Thus, it is possible to use only a single memory or to intentionally focus a memory bandwidth onto a single memory in situations where such an arrangement is advantageous.

The inventive concepts may enable clock gating or power gating of another memory which is at an idle state. Power consumption may be reduced by inducing the memory into a self-refresh mode. If an interleaving access operation is applied to the whole of memories, a power and a clock may be continuously supplied to the whole of the memory devices. Thus, power consumption may increase.

In a memory system using an interleaving access operation, the inventive concepts may perform a partial linear access operation by including linear access remapping logic at a front stage of a specific processor (e.g., modem). In this manner, power consumption can be reduced for processors or for processor operations that do not require the performance gains that otherwise would be realized by use of an interleaved access arrangement.

Figure 13:
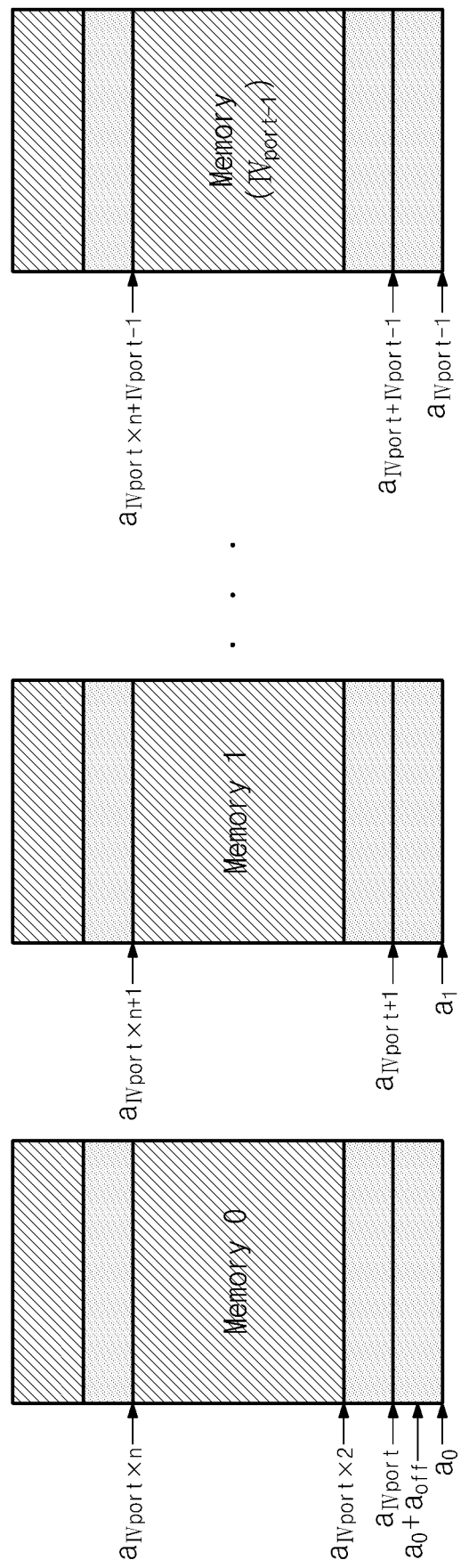
FIG. 13 is a diagram illustrating an expression of a linear access operation of a memory system including two or more memory devices, according to an embodiment of the inventive concepts.

FIG. 13 is a diagram illustrating an expression of a linear access operation of a memory system including two or more memory devices, according to an embodiment of the inventive concepts.

In FIG. 13, '$a_n$', 'IVsize', and 'IVport' may indicate an base address of an nth chuck, a chunk size, the number of memory ports (0, 1, 2, ..., port), respectively.

Since a memory access address 'a' is divided into an nth base address '$a_n$' and an offset address '$a_{off}$', the memory access address a may be expressed by the following equation 1.

$$a = a_n + a_{off} \quad \text{[Equation 1]}$$

In the equation 1, since a chuck size is IVsize, $0 =< aoff < IVsize$. In the equation 1, '$a_n$' may indicate a value of an address area increased from a base address '$a_0$' of a first chunk by a chunk number, and may be expressed by the following equation 2.

$$a_n = a_0 + IV_{SIZE} \times n \quad \text{[Equation 2]}$$
$$n = \frac{a_n - a_0}{IV_{SIZE}}$$

It is assumed that a chunk is selected in consideration of interleaving. If there is selected a memory chunk corresponding to an rth port of one or more memory ports and there is selected a kth memory chunk from the lowermost stage at each memory port, '$a_n$' may be expressed as follows.

$$a_n = a_{(r,k)} = a_{IVport \times k \times r} = a_0 + IV_{SIZE} \times (IVport \times k + r) = a_0 + IV_{size} \times IVport \times k + IV_{SIZE} \times r \quad \text{[Equation 3]}$$

In the equation 3, 'r' may indicate a value for selecting a row, 'k' may indicate a value for selecting a column, and $0 \leq r < IVport$.

Thus, as described with reference to FIGS. 7 and 8, a chunk bit described in FIG. 7 may correspond to '$a_{off}$', ILB of an original address may correspond to a 'r' value of the equation 3 selecting a memory port, and IAA and LAA bits may correspond to a 'k' value. It is possible to generate an address for accessing each memory port using a bit of an original address. As described with reference to FIG. 7, it is possible to remap a linear address partially by handling LAA and ILB bits.

According to an embodiments of the inventive concepts, when the interleaving mode is selected by CONFIG signal, at least two memory ports can write or read simultaneously larger data to and from the corresponding memory ports to increase data band width by ignoring some ILB bit in the original address in FIG. 3. On the other hand, in linear addressing mode, only a selected port can operate and reduce power consumption compared with the interleaving mode.

A memory system according to an embodiment of the inventive concepts may be applied to various products. For example, the memory system according to an embodiment of the inventive concepts may be applied to a digital camera, a camcorder, a mobile phone, a smart phone, a digital TV, a PMP, a PSP, a PDA, and other mobile devices.

A memory system according to an embodiment of the inventive concepts may be packed by a variety of packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and other types of packages.

While the inventive concepts have been described with reference to exemplary embodiments, it will be apparent to those skilled in the art that various changes and modifications may be made without departing from the spirit and scope of the present specification. Therefore, it should be understood that the above embodiments are not limiting, but rather are illustrative.

What is claimed is:

1. A memory channel interleaving method for a power reduction or a performance improvement, the method comprising:
   remapping a memory access address for a first memory device and/or a second memory device, each of the first memory device and the second memory device including an interleaving access region and a linear access region, the memory access address including an interleaving access area for a performance improvement use and a linear access area for a power reduction use;
   receiving, at a linear address remapping logic, a selection signal to select an interleaving mode for performance improvement or a linear mode for power reduction;
   deciding, by the linear address remapping logic, whether the memory access address corresponds to the interleaving access area or the linear access area;
   performing an interleaving access operation on the interleaving access regions in the first and second memory devices in the interleaving mode; and
   performing a linear access operation on the linear access region in only one of the first and second memory devices in the linear mode,
   wherein the first memory device is associated with a first port and a memory controller, and
   the second memory device is associated with a second port and the memory controller.

2. The method of claim 1, further comprising performing a partial interleaving access operation without requiring a change of the memory controller.

3. The method of claim 1, wherein the first port and the second port operate simultaneously in the interleaving mode, and
   only one of the first port and the second port operates in the linear mode.

4. The method of claim 1, wherein each of the first memory device and the second memory device is a dynamic random access memory (DRAM) device.

5. The method of claim 1, wherein the linear address remapping logic is placed between a bus connection unit and the memory controller.

6. A system for providing a memory channel interleaving for a power reduction or a performance improvement, the system comprising:
   a first memory device, including a first interleaving access region and a first linear access region;
   a second memory device including a second interleaving access region and a second linear access region;
   a system on chip (SoC) comprising a linear address remapping logic and a memory controller,
   wherein the linear address remapping logic is configured to remap a memory access address for the first memory device and/or a second memory device, the memory access address including an interleaving access area for a performance improvement use and a linear access area for a power reduction use, the linear address remapping logic is configured to receive a selection signal to select an interleaving mode for performance improvement or a linear mode for power reduction, the linear address remapping logic is configured to decide whether the memory access address corresponds to the interleaving access area or the linear access area, wherein an interleaving access operation is performed on the interleaving access regions in the first and second memory devices in the interleaving mode, and a linear access operation is performed on the linear access region in only one of the first and second memory devices in the linear mode, the first memory device is associated with a first port, and the second memory device is associated with a second port.

7. The system of claim 6, wherein the first memory device is associated with the memory controller, and the second memory device is associated with the memory controller.

8. The system of claim 6, wherein the memory controller is configured to perform the interleaving access operation or the linear access operation according to the interleaving mode or the linear mode.

9. The system of claim 6, wherein the memory controller performs a partial interleaving access operation without requiring a change of the memory controller.

10. The system of claim 6, wherein the memory controller performs the interleaving access operation to the interleaving access region.

11. The system of claim 6, wherein the memory controller performs the linear access operation to the linear access region.

12. The system of claim 6, wherein the first port and the second port operate simultaneously data in the interleaving mode, and only one of the first port and the second port operates in the linear mode.

13. The system of claim 6, wherein each of the first memory device and the second memory device is a dynamic random access memory (DRAM) device.

14. The system of claim 6, wherein the linear address remapping logic is placed between a bus connection unit and the memory controller.

15. A system on chip (SoC) comprising:
a linear address remapping logic configured to remap a memory access address for a first memory device and/or a second memory device, and configured to receive a selection signal to select an interleaving mode for performance improvement or a linear mode for power reduction; and
a memory controller configured to perform a partial interleaving access operation,
wherein the memory access address includes an interleaving access area for a performance improvement use and a linear access area for a power reduction use, and
the linear address remapping logic is configured to decide whether the memory access address corresponds to the interleaving access area or the linear access area,
wherein an interleaving access operation is performed on interleaving access areas in the first and second memory devices in the interleaving mode, and a linear access operation is performed on a linear access area in only one of the first and second memory devices in the linear mode.

16. The SoC of claim 15, wherein the memory controller performs the partial interleaving access operation without requiring a change of the memory controller.

17. The SoC of claim 15, wherein the memory controller performs the interleaving access operation or the linear access operation according to the interleaving mode or the linear mode.

18. A memory channel interleaving method for a power reduction or a performance improvement, the method comprising:
remapping a memory access address for two or more memory devices accessed via two or more respective memory ports with an interleaving access area and a linear access area, the interleaving access area comprising memory addresses for an interleaving access operation for the performance improvement, the linear access area comprising memory addresses for a linear access operation for the power reduction;
receiving a signal that includes a power reduction mode or a performance improvement mode; and
performing the interleaving access operation or the linear access operation according to the performance improvement mode or the power reduction mode.

19. The method of claim 18, wherein the linear access area comprises a first address range associated with a first memory device among the two or more memory devices and accessed via a first port among the two or more memory ports, and a second address range associated with a second memory device among the two or more memory devices and accessed via a second port among the two or more memory ports.

20. The method of claim 19, wherein the performing the linear access operation comprises using the first address range associated with the first memory device while the second memory device is placed in the power reduction mode.

21. The method of claim 20, further comprising when a last memory address in the first address range of the linear access area is reached:
placing the first memory device in the power reduction mode;
activating the second memory device; and
performing the linear access operation in the power reduction mode for the second address range associated with the second memory device.

22. The method of claim 18, wherein the linear access operation is performed in the linear access area with a first memory device among the two or more memory devices in the performance improvement mode and a second memory device among the two or more memory devices in the power reduction mode.

23. The method of claim 18, wherein the interleaving access area or the linear access area comprises a bit specifying a memory device.

24. The method of claim 18, wherein a memory controller receives the signal that includes the power reduction mode or the performance improvement mode via a bus connection unit.

25. The method of claim 18, further comprising adjusting a bandwidth balance among the two or more memory devices through the interleaving access operation.

26. A memory channel interleaving system for a power reduction or a performance improvement, the system comprising:
a linear address remapping logic configured to remap a memory access address for two or more memory devices accessed via two or more respective memory ports with an interleaving access area and a linear access area, the interleaving access area comprising memory addresses for an interleaving access operation for the performance improvement, the linear access area comprising memory addresses for a linear access operation for the power reduction, a linear address remapping logic being configured to receive a signal that includes a power reduction mode or a performance improvement mode; and a memory controller configured to perform the interleaving access operation or the linear access operation according to the performance improvement mode or the power reduction mode.

27. The system of claim 26, wherein a bandwidth balance among the two or more memory devices is adjusted through the interleaving access operation.

28. A system for providing a memory channel interleaving for a power reduction or a performance improvement, the system comprising:

a system on chip (SOC) comprising linear address remapping logic configured to remap a memory access address for two or more memory devices accessed via two or more respective memory ports with an interleaving access area and a linear access area, the interleaving access area comprising memory addresses for an interleaving access operation for the performance improvement, the linear access area comprising memory addresses for a linear access operation for the power reduction, a linear address remapping logic being configured to receive a signal that includes a power reduction mode or a performance improvement mode; and a memory controller residing on the SoC and configured to perform the interleaving access operation or the linear access operation according to the performance improvement mode or the power reduction mode.

29. The system of claim 28, wherein the linear access operation is performed in the linear access area with a first memory device among the two or more memory devices in the performance improvement mode and a second memory device among the two or more memory devices in the power reduction mode.

* * * * *